June 5, 1951 L. J. DENNEY ET AL 2,555,324

MOUNTING STRUCTURE FOR TELEPHONE EXCHANGES

Filed Sept. 20, 1947 3 Sheets-Sheet 1

INVENTORS
LEE JOHN DENNEY
STEPHEN R. WAGNER
BY Percy P. Lantzy
ATTORNEY

June 5, 1951 L. J. DENNEY ET AL 2,555,324

MOUNTING STRUCTURE FOR TELEPHONE EXCHANGES

Filed Sept. 20, 1947 3 Sheets-Sheet 2

INVENTORS
LEE JOHN DENNEY
STEPHEN R. WAGNER
BY Percy P. Lantzy
ATTORNEY

June 5, 1951 L. J. DENNEY ET AL 2,555,324

MOUNTING STRUCTURE FOR TELEPHONE EXCHANGES

Filed Sept. 20, 1947 3 Sheets-Sheet 3

INVENTORS
LEE JOHN DENNEY
STEPHEN R. WAGNER

BY Percy P. Lantzy
ATTORNEY

Patented June 5, 1951

2,555,324

UNITED STATES PATENT OFFICE 2,555,324

MOUNTING STRUCTURE FOR TELEPHONE EXCHANGES

Lee John Denney, Nutley, and Stephen R. Wagner, East Orange, N. J., assignors to Federal Telephone and Radio Corporation, New York, N. Y., a corporation of Delaware Application September 20, 1947, Serial No. 775,300

2 Claims. (Cl. 179—98)

This invention relates to new and useful improvements in mounting structures for telephone exchanges.

The object of the invention is to provide a metal, preferably an aluminum, frame on which the entire exchange is mounted and wired in the factory, so that the assembly may be shipped complete, leaving to the installer merely the connection of wires with a telephone cable.

With this object in view we provide for the mounting of selectors, batteries and the line circuit connections on one side of the frame, and the relays, marker switches, coils, ringing machines and other circuit elements on the other side of the frame. The outside cable can be run in either at the top or at the bottom.

According to one feature of the invention the circuit elements are mounted on relay gates which may be hingedly or otherwise supported from the frame after they have been completely wired, the gates being placed in such position as to insure minimum length of connections with the front of the frame.

These and other features of the invention will more clearly appear from the following detailed description of a preferred embodiment thereof and the appended claims.

Figures 1, 2:
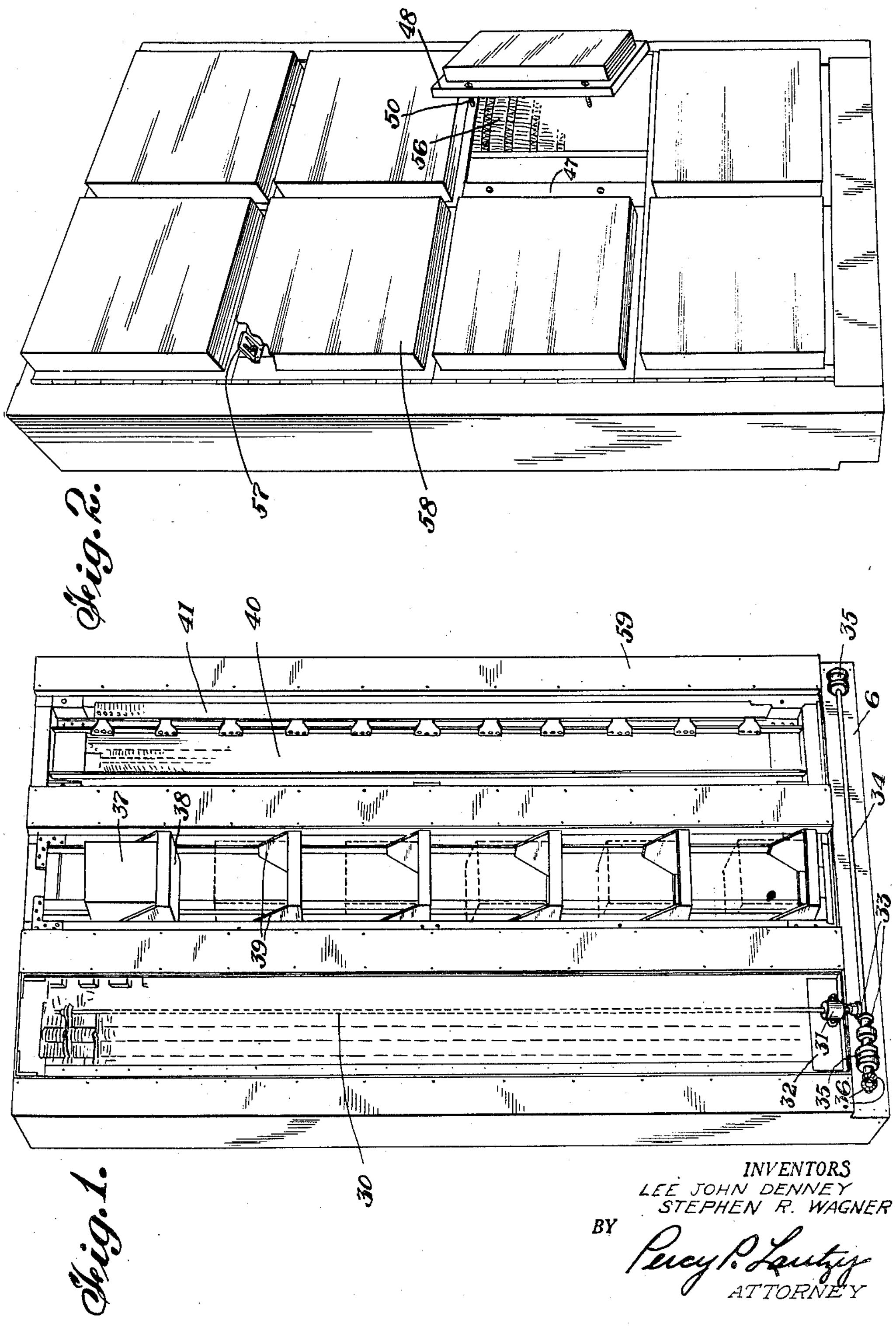
Figs. 1 and 2 are, respectively, front and rear views of the finished assembly.

The main frame is composed of aluminum channel pieces. There are four corner posts 1, 2, 3, 4 of L-shaped cross section held together by top assembly 5 and bottom assembly 6, and by intermediate transverse plates 7 and 8. Triangular plates like 9 reinforce the points of juncture between the ends of posts 1—4 and the top and bottom 5 and 6.

Figures 3, 4:
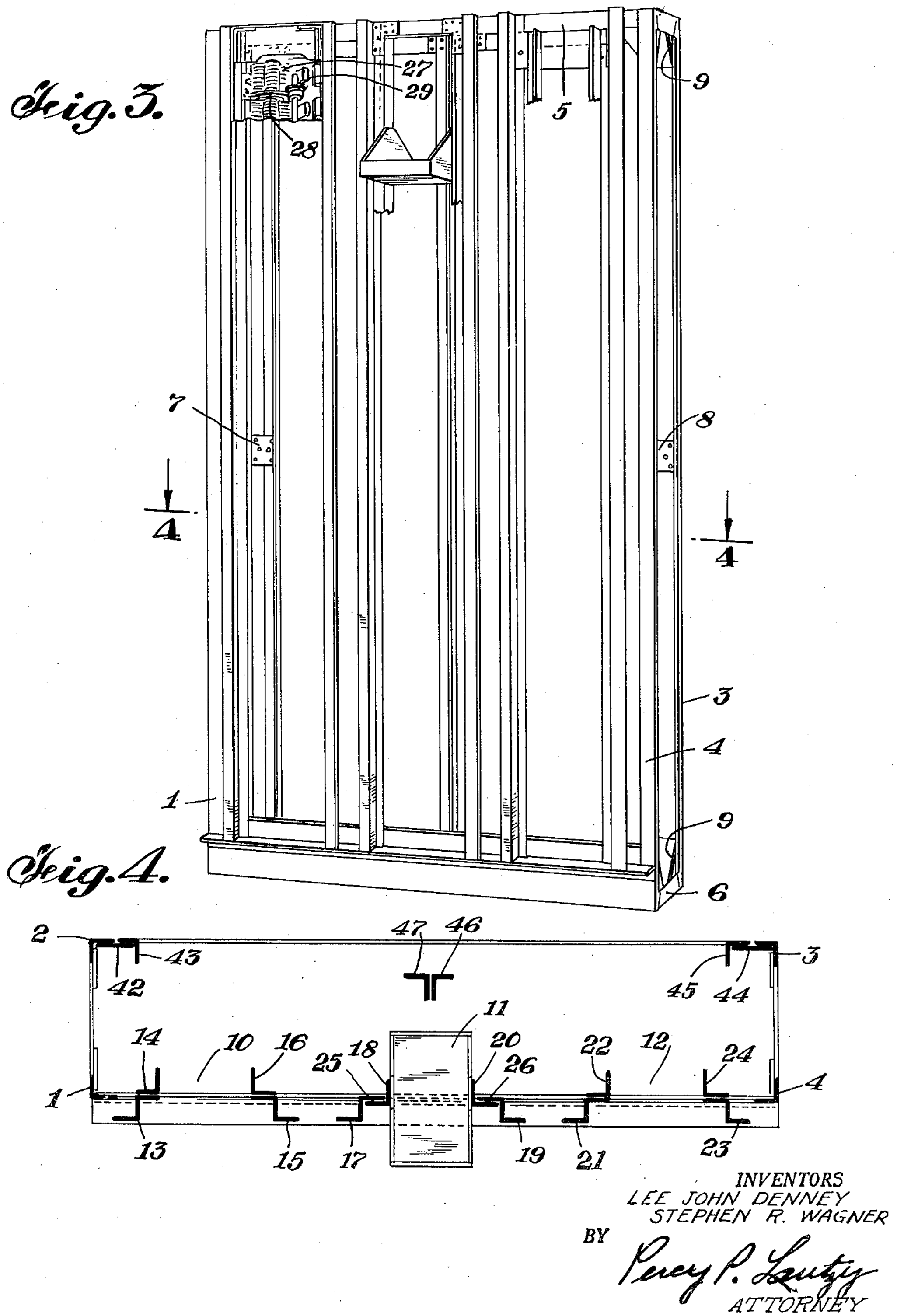
Fig. 3 is a perspective of the metal frame.
Fig. 4 is a section along lines 4—4 of Fig. 3.

The front of the main frame is divided into three longitudinal sections 10, 11 and 12 (Fig. 4). Each section is delimited by Z and L-shaped bars fastened to the top 5 and bottom 6. For section 10 these are shown at 13, 14 and 15, 16; for section 11 at 17, 18 and 19, 20; and for section 12 at 21, 22 and 23, 24. The Z and L bars of sections 10 and 12 have their ends secured to the front and back surfaces, respectively, of the top and bottom 5 and 6. The delimiting bars of section 11 are fastened to the same sides of the top and bottom so that their legs interlock as indicated at 25 and 26.

Within section 10 are mounted one on top of the other as many selector switches as are needed for the system whose central exchange equipment is carried within this frame, in the present case twenty-four 100 point switches. The selectors are of the rotary power-driven type, each having a terminal bank 27, wipers 28, and a clutch magnet 29. A vertical shaft 30 extends throughout the length of section 10 rotatably mounted in a bearing 31 carried on plate 32 fastened between the free arms of Z bars 13 and 15 near the lower ends thereof. The shaft 30 is constantly driven via gears 33 by a horizontal shaft 34 which is mounted in bearings 35 on the front plate of bottom 6 of the frame. The horizontal shaft is constantly driven by a motor (not shown) through gearing 36.

The second section 11 holds six storage batteries 37, each seated on a platform 38 suspended by two plates 39 fastened to the inwardly projecting legs of the L bars 18 and 20. These storage batteries are connected in series by vertical bus bars, without crossovers.

The third section 12 comprises the line protectors 40 fastened in two separate strips to the L-shaped bar 22 of the section, and line terminals 41 which, in strips, are fastened to the L-shaped bar 24 of the section. Thus, it will be seen that section 12 contains the main distributing frame. The protectors are wired in the factory, and ten-foot lengths of tip cable are wired to the line side for connection to distribution cables.

The rear side of the main frame (Fig. 2) is divided into two halves between L-shaped bar 43 fastened by means of a plate 42 to the corner post 2, and L-shaped bar 45 is fastened by means of a plate 44 to the corner post 3. These L-shaped bars 43 and 45 extend from the bottom 6 to the top 5. Two L-shaped bars 46 and 47 mounted back-to-back also extend from the bottom to the top of the main frame, but they are mounted on the inside structure of the main frame whereby they are on a plane inside of that of the L bars 43 and 45. The bars 46 and 47 halve the rear of the frame vertically.

Figure 5:
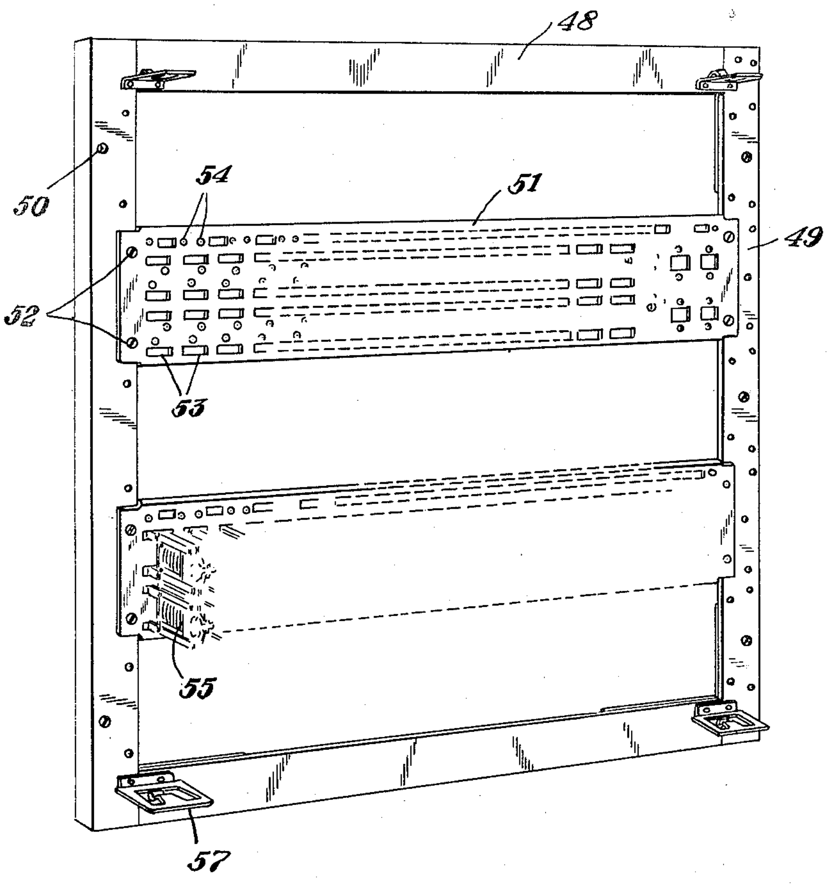
Fig. 5 is a perspective of a partly assembled relay gate without its cover.

Four aluminum sub-frames like 48 (Fig. 5) are each mounted by means of a hinge 49 on the L bar 45 and four on L bar 43. As shown in Fig. 2, these frames may be swung about their hinges and may, by means of screws 50, be attached to the L bar 47 or 46, as the case may be. Each of the sub-frames has a maximum of five perforated aluminum mounting plates 51 fastened thereto by means of screws 52. The mounting plates have square openings 53 and holes 54 cut therein so that circuit elements like relays 55, marker switches, coils, ringing generator, etc. may be fastened to the plates with the circuit terminals projecting to the rear of the plates where the electrical connections are made.

As shown in Fig. 2 the rear of the terminal banks 27 which are multipled together by means of a flat cable 56 may be connected to the circuit elements mounted on the sub-frames or gates 48 by running short connections along the side of the main frame. Each gate carries also four spring clips 57 to hold in place a cover 58 which protects the relays and other circuit elements mounted on the gate from dust and accidental contact.

The outside of the frame elements is covered with finishing plates like 59.

It will be obvious that the circuit elements may be fastened to the mounting plates 51 and provided with soldered connections before the mounting plate is fastened to the gate 48, and that the finished gate can be mounted on that section of the main frame where its connection with the elements on the front of the frame can be accomplished most readily. Thus, any gate may carry the circuit elements of the line circuit, or the register link circuit, or the local or toll link circuit, or register circuit, or toll circuit, or ringing equipment etc. The selectors, batteries, terminals and protectors are also completely wired and connected with the relay gates before the equipment is shipped from the factory. All the installer has to do is to connect the telephone cable to one or more cables projecting from the fully wired telephone exchange.

What is claimed is:

1. In a mounting structure for telephone exchanges, four corner posts, top and bottom members holding together said corner post at the top and at the bottom to form a rectangular frame, a plurality of bars fastened to the top and bottom members dividing the front of said frame vertically into three sections and the rear into two sections, a plurality of selector switches having multiple terminal banks and wipers, said switches being disposed in vertically stacked relation and being fastened to the bars delimiting a first front section of said frame, a plurality of horizontal shelves fastened to the bars of a second front section, a plurality of line protectors fastened to one delimiting bar of the third front section, a plurality of line terminals fastened to the other delimiting bar of said third section, a plurality of sub-frames, means for movably mounting said sub-frames on the rear corner posts of said rectangular frame, a plurality of circuit elements mounted on each of said sub-frames and means for connecting said circuit elements to respective selector switches, batteries, line protectors, and line terminals such as to allow for the movement of said sub-frames.

2. In a mounting structure for telephone exchanges, four channel metal corner posts, top and bottom members holding together said corner posts to form a substantial rectangular frame, bar members fastened to the top and bottom members, sub-dividing the front of said frame vertically into three sections and the rear of said frame into two sections, a plurality of selector switches fastened in substantially stacked relation to the bars delimiting a first front section, a plurality of horizontal shelves for batteries fastened to the bars of the second front section, a longitudinal strip of line protectors fastened to one delimiting bar of the third front section, a longitudinal strip of line terminals fastened to the other delimiting bar of said third section, a plurality of cables secured to the top member of said rectangular frame and electrically connected to said selector switches, protectors and terminals, a plurality of sub-frame hingedly mounted on the rear corner posts being operative to be swung to and from the rear dividing bars, a plurality of perforated plates fastened to each of said sub-frames, each of said perforated plates carrying telephone circuit elements having terminals projecting through the perforations therein, and means for electrically connecting respective ones of said circuit elements to said selector switches, batteries, line protectors and line terminals such as to allow movement of said sub-frames.

LEE JOHN DENNEY.
STEPHEN R. WAGNER.

REFERENCES CITED

The following references are of record in the file of this patent:

UNITED STATES PATENTS

| Number | Name | Date |
|---|---|---|
| 1,779,058 | Borgmann | Oct. 21, 1930 |
| 1,809,025 | Cruser | June 9, 1931 |
| 1,863,376 | Kessler | June 14, 1932 |
| 1,874,566 | McElyea | Aug. 30, 1932 |
| 1,882,854 | Mead | Oct. 18, 1932 |
| 1,886,296 | Neir | Nov. 1, 1932 |
| 2,065,897 | Kenner | Dec. 27, 1936 |
| 2,103,501 | Waldron | Dec. 28, 1937 |

FOREIGN PATENTS

| Number | Country | Date |
|---|---|---|
| 647,674 | France | Nov. 27, 1928 |